United States Patent [19]
Halonen

[11] Patent Number: 5,487,185
[45] Date of Patent: Jan. 23, 1996

[54] METHOD FOR EXTENDING MEAN TIME BETWEEN FAILURES OF TRANSMITTERS USED IN A CELLULAR SYSTEM, BY INTERMITTENTLY SHIFTING AMONG THEM WHICH IS TRANSMITTING A CONTROL CHANNEL VERSUS WHICH IS TRANSMITTING A TRAFFIC CARRIER

[75] Inventor: Harri Halonen, Jääli, Finland

[73] Assignee: Nokia Telecommunications OY, Espoo, Finland

[21] Appl. No.: 137,128

[22] PCT Filed: Dec. 31, 1992

[86] PCT No.: PCT/FI92/00367

§ 371 Date: Oct. 20, 1993

§ 102(e) Date: Oct. 20, 1993

[87] PCT Pub. No.: WO/93/17506

PCT Pub. Date: Sep. 2, 1993

[30] Foreign Application Priority Data

Feb. 24, 1992 [FI] Finland ................. 920793

[51] Int. Cl.⁶ ................. H04B 1/04; H04Q 7/30
[52] U.S. Cl. ................. 455/127; 455/8; 455/33.1; 455/53.1; 455/67.1; 455/115
[58] Field of Search ................. 455/8, 9, 11.1, 455/17, 33.1, 53.1, 54.1, 67.1, 103, 115, 117, 127; 379/58, 59, 34; 371/20.1, 20.2

[56] References Cited

U.S. PATENT DOCUMENTS 4,940,984  7/1990  Kleiber .................. 455/115 X

FOREIGN PATENT DOCUMENTS

| 0271347 | 6/1988 | European Pat. Off. | H04B 1/04 |
| 4-18826 | 1/1992 | Japan | 455/8 |
| 9209154 | 5/1992 | WIPO | H04B 7/26 |

*Primary Examiner*—Chi H. Pham
*Attorney, Agent, or Firm*—Cushman Darby & Cushman

[57] ABSTRACT

The invention relates to a method for controlling base station transmitters in a cellular system, such as a GSM system, the base station comprising at least two transmitters (TX1 ... TX4) transmitting on at least one control carrier and at least one traffic carrier, wherein the power transmitted on the traffic carrier is on the average lower than the power transmitted on the control carrier. In order to improve the overall life expectancy of the transmitters, at least the transmitter transmitting on the control carrier is changed constantly. (FIG. 1)

7 Claims, 1 Drawing Sheet

METHOD FOR EXTENDING MEAN TIME BETWEEN FAILURES OF TRANSMITTERS USED IN A CELLULAR SYSTEM, BY INTERMITTENTLY SHIFTING AMONG THEM WHICH IS TRANSMITTING A CONTROL CHANNEL VERSUS WHICH IS TRANSMITTING A TRAFFIC CARRIER

BACKGROUND OF THE INVENTION

The present invention relates to a method for controlling base station transmitters in a cellular system, the base station comprising at least two transmitters transmitting on at least one control carrier and at least one traffic carrier, wherein the power transmitted on the traffic carrier is, on the average, lower than the power transmitted on the control carrier.

In the GSM radio system (like in any other similar cellular system, such as the PCN system), the channels to be used can be divided into two different classes: traffic channels (TCH) and control channels.

Traffic channels, which transmit either speech or subscriber data, employ a dynamic control of transmission power both at the base station and at the mobile station. The power control word comprises four bits, so that 16 power levels are available. The spacing between two successive power levels is 2 dB, the entire power control range being 30 dB. In the so-called TX-on time slot, in which the transmission takes place, the transmission power (on the traffic channel) is adjusted in each time slot of a frame in accordance with the above-mentioned power control word, to one of the sixteen different power levels.

The control channels are used for signalling and synchronization. The GSM control channels include a broadcast control channel (BCCH) which is a one-way channel from the base station to the mobile stations. The BCCH channel transmits cell-specific data (concerning power levels, frequencies, etc.) to the mobile stations. The power control of the mobile station is based on measurements performed by the base station, and vice versa. Because the measurements performed by the mobile station need a reference level, the power transmitted on the BCCH channel is constant in each cell. At the same time, this constant power is the maximum power of the cell, in order that the signal strength of the channel can be maintained so as to be acceptably strong even within the edge areas of the cell.

At present, the same base station transmitter is used for transmitting the BCCH carrier all of the time, and so this transmitter has to transmit at a power considerably higher than the average transmission power of the base-station transmitters transmitting the traffic carrier. As a result, the mean time between failure (MTBF) of the BCCH transmitter is considerably shorter than that of the transmitters transmitting the traffic carrier, which, in turn, negatively affects the lifetime of the entire transmitter unit of the base station.

SUMMARY OF THE INVENTION

The object of the present invention is to improve the overall life expectancy of the transmitters of the base station. This is achieved by means of a method according to the invention, which is characterized in that which one of the transmitters is transmitting the control carrier is changed frequently.

The basic idea of the invention is to increase the lifetime of the transmitter unit by dividing the transmission of the control channels having an average transmission power which is clearly higher than the average transmission power of the traffic channels, between different transmitters.

The arrangement according to the invention improves significantly the overall life expectancy of the base station transmitters, as appears from the calculation example which is provided hereinbelow.

BRIEF DESCRIPTION OF THE DRAWING

In the following, the invention and its preferred embodiments will be described in more detail with reference to the examples of the attached drawings, in which.

DETAILED DESCRIPTION

Figure 1:
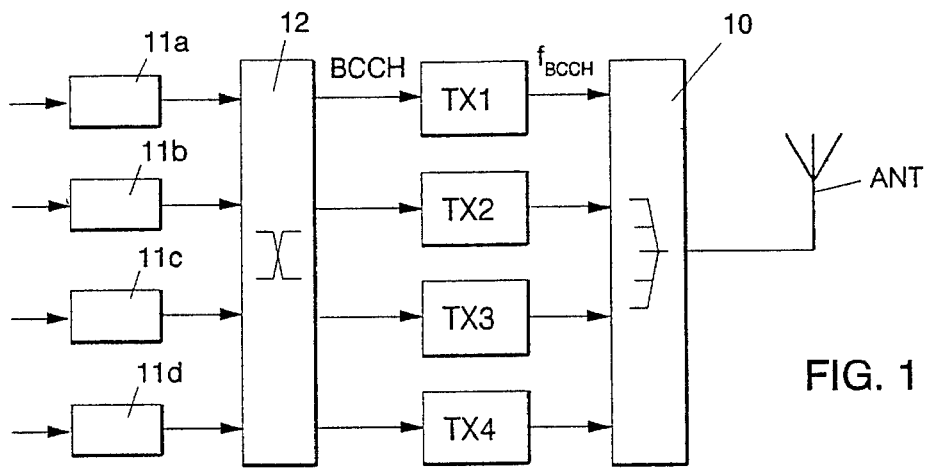
FIG. 1 is a block diagram illustrating the transmitter arrangement of a base station in a cellular system at a first time instant.
Figure 2:
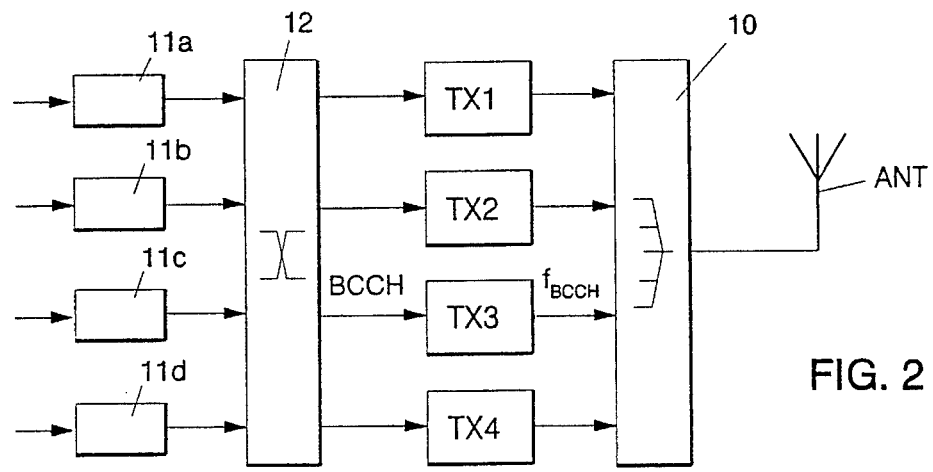
FIG. 2 illustrates the transmitter arrangement of FIG. 1 at a second time instant.

FIGS. 1 and 2 are block diagrams of a base station transmitter unit in a cellular system, such as a GSM system, in which the invention is applied. The base station comprises at least two, in this specific case four, transmitters indicated by the references TX1 . . . TX4. The outputs of the transmitters are connected to a radio-frequency summing means 10, which connects the outputs of the transmitters to a common transmitting antenna ANT. The summing means 10 contains a manually or automatically tunable transmission filter of the bandpass type for each transmitter.

The base station further comprises a plurality of baseband signal processing units 11a to 11d, which generate baseband modulation signals for the transmitters TX1 . . . TX4. Data to be transmitted are coded and positioned in a frame structure in the signal processing units. A switching matrix 12 is provided between the signal processing units and the transmitters, which switches outgoing baseband signals to the transmitters.

As is well-known, the base station transmits both on traffic channels and on control channels, including a broadcast control channel BCCH (in the GSM system). Because the average transmission power of the traffic channels in practical conditions is lower, and probably considerably lower than the power transmitted on the BCCH carrier (which is a constant power in the GSM system; in practice, that constant power corresponds to the maximum power of the cell), the transmitter transmitting on the BCCH carrier is changed constantly. In the BCCH transmission, BCCH data is thus connected at the first time instant, e.g., to the transmitter TX1 transmitting at a BCCH frequency $f_{BCCH}$ (FIG. 1). After a predetermined time period, the transmitter TX3, for instance, starts to operate as the BCCH transmitter, so that the BCCH data is now connected to the transmitter TX3, which transmits at the BCCH frequency (FIG. 2). In this way the transmitter is changed periodically at predetermined intervals. The time between the transmitter changes can be relatively long as compared with, e.g., the system time slot due to the rather long warm-up time of the transmitters. In practice, the time between the changes may be even a few seconds, but it may also be shorter, e.g., equal to the TDMA frame (the length of the frame in the GSM system is about 4.615 ms). The BCCH transmitter can be changed, e.g., in a predetermined sequence. At a two-carrier base station the changing means that each transmitter transmits alternately the BCCH channel carrier and the other carrier.

Figure 3:
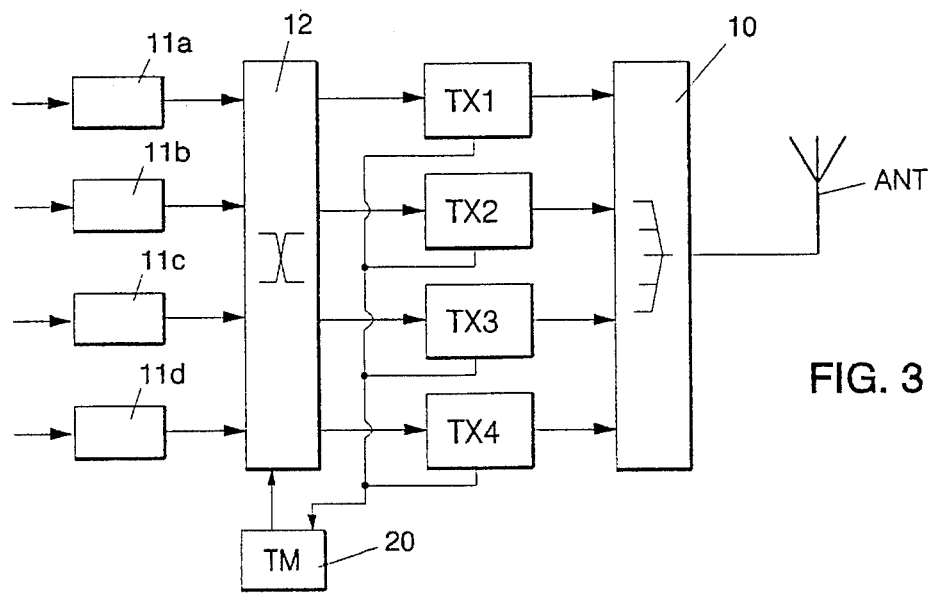
FIG. 3 is a block diagram illustrating a base station transmitter arrangement in a cellular system when applying a preferred embodiment of the invention.

FIG. 3 shows an embodiment in which changing of the BCCH transmitter depends on the measuring of transmitter temperature. A temperature measuring unit 20 measures (constantly or at predetermined intervals) the temperature of each transmitter TX1 . . . TX4. The switching matrix 12 receives the temperature data from the measuring unit and controls the channels so that at least the BCCH transmission (effected at the maximum power of the cell) will always be performed by the coldest transmitter.

This embodiment may also be extended to all channels to be transmitted, so that the channel having the highest power at each particular moment is assigned to the coldest transmitter, the second highest power to the next coldest transmitter, etc. In this embodiment, both the control and the traffic channels can be taken into account, that is, it is possible to achieve proper control merely on the basis of the mutual transmission powers of the traffic channels, e.g., in time slots where transmission takes place only on the traffic channels (not on the control channel).

The following calculation example describes the effect of the changing procedure on the overall life expectancy of the transmitters. Assume that the base station comprises two transmitters (two carriers), in addition to which She following further assumptions are made:

| | |
|---|---|
| Ambient temperature | 25° C. |
| Dissipation power in other transmitter unit modules (i.e., other then the power amplifier) | 7.8 W |
| Efficiency of the power transmitter | 28% |
| Coefficient for temperature rise | 0.65° C./W. |

1. The transmitter transmits the BCCH channel

| | |
|---|---|
| Output power | 28 W |
| Unit temperature | 77° C. |

Assume that the mean time between failure (MTBF) of the unit is 65,000 h=7.4 yrs.

2. The transmitter transmits only traffic channels

| | |
|---|---|
| Average transmission power | 1 W |
| Unit temperature | 32° C. |
| MTBF (assuming that the power is doubled when the temperature drops 10° C.) | 1,469,000 h = 167.7 yrs. |

3. The transmitter transmits alternately the BCCH carrier and the carrier of the traffic channels.

| | |
|---|---|
| Average transmission power | 10.5 W |
| Unit temperature | 48° C. |
| MTBF | 55.4 yrs. |

4. Overall lifetime when only one transmitter transmits the BCCH channel. The MTBF of the transmitter transmitting at full power is 7.4 yrs. When this transmitter is broken, the other transmitter starts to operate at full power.

MTBF in all=2*7.4 yrs=14.8 yrs.

5. Overall lifetime when the BCCH channel is transmitted alternately.

MTBF in all=2*55.4 yrs=110.8 yrs.

The figures in the above calculation example are rather relative than absolute. As appears from points 4 and 5, however, the principle according to the invention affects significantly the overall life expectancy of the transmitters.

Even though the invention has been described above with reference to the example of the attached drawings, it is to be understood that the invention is not restricted to the illustrated example, but can be modified in various ways within the inventive concept disclosed above. Even though the BCCH channel of the GSM system is mainly referred to above, the method is equally applicable to other transmitter units in which the basic situation is similar. The structure of the base station, for instance, may also be varied in many ways. The base station may be provided with, e.g., a frequency hopping function which may be realized by variable-frequency transmitters or by fixed-frequency transmitters with baseband frequency hopping.

I claim:

1. A method for extending mean time between failures of a plurality of transmitters of a base station in a cellular system transmitting on at least one control channel at a higher average power level and transmitting on at least one traffic carrier at a lower average power level, compared with mean time between failures for said plurality of transmitters when one of said transmitters is dedicated to transmitting on said at least one control channel, comprising:

while operating said cellular system, from time to time and independently of instigation due to occurrence of actual failure of any one of said transmitters, changing between or among which of said transmitters is or are being used for transmitting on said at least one control channel.

2. The method of claim 1, further comprising:

while operating said cellular system, measuring actual temperatures of respective ones of said transmitters; and performing said changing so as to use a coldest one of said transmitters based on said measuring for transmitting on said at least one control channel.

3. The method of claim 1, further comprising:

while operating said cellular system, measuring actual temperatures of respective ones of said transmitters; and performing said changing so as to inversely match transmitter temperature to transmitting power level, whereby the transmitter having the coldest measured temperature is used for transmitting on said at least one control channel, and the transmitter having the warmest measured temperature is used for transmitting on said at least one traffic carrier.

4. The method of claim 1, wherein:

said changing is performed in a preselected sequence, so as to periodically return each said transmitter to duty as a transmitter on said at least one control channel, and so as to periodically return each said transmitter to duty as a transmitter on said at least one traffic carrier.

5. The method of claim 1, wherein:

there are only two to four of said transmitters subject to said changing.

6. The method of claim 1, wherein:

said cellular system is a GSM system.

7. The method of claim 6, wherein:

said changing occurs on an interval of preselected length ranging from 4.615 ms to a few seconds.

* * * * *